2,906,712
Patented Sept. 29, 1959

2,906,712
DEFOAMANT COMPOSITION

Roy T. Edwards, Roslyn, and Ernst P. Rittershausen, Hempstead, N.Y., assignors to Socony Mobil Oil Company, Inc., a corporation of New York No Drawing. Application December 13, 1955
Serial No. 552,703

9 Claims. (Cl. 252—358)

The present invention relates to the suppression or inhibition of the formation of foam. It is more particularly concerned with materials that suppress the formation of foam in aqueous media, such as those of sewage disposal plants.

In the operation of steam boilers it has been customary to treat the water with basic materials in order to prevent the formation of corrosion. Such treatment, however, renders the feed water decidedly alkaline and frequently imparts to it tendencies to form excessive amounts of foam. In sewage disposal plants, on the other hand, the aqueous media are decidedly acidic or at least substantially neutral. In other words, the pH of the aqueous media in such plants is never greater than about 7, whereas, on the other hand, the pH of boiler feed waters is decidedly gerater than 7. Yet, quite often the aqueous media having a pH lower than 7 will have a tendency to foam. This is particularly noticeable in modern sewage disposal plants because of the increased use of household detergents. In such cases, the acidic sewage disposal liquors have a marked tendency to produce large amounts of foam. It will be recognized that such foaming impairs the efficient operation of the disposal plants. It will be appreciated, therefore, that it is highly desirable to provide a means of inhibiting or suppressing the formation of foam in operations that involve the use of aqueous media having a pH less than 7, such as in sewage disposal plants.

In the treatment of boiler feed waters, there have been proposed many methods for suppressing the formation of foam in the boiler tubes. On the other hand, the treatment of acidic aqueous media, such as encountered in sewage disposal plants, is a relatively new problem. Insofar as is now known, no methods of treatment have been advanced for suppressing the formation of foam in aqueous media having a pH lower than about 7.

It has now been found that the formation of foam in aqueous media having a pH less than 7 can be suppressed simply and economically. It has been discovered that such foaming can be suppressed by adding to the aqueous media small amountts of a defoamant comprising a carrier, an amine, and a nonionic surface active agent.

Accordingly, it is an object of this invention to provide a defoamant for the suppression of foam in aqueous media having a pH less than 7. Another object is to provide a means for suppressing the formation of foam in modern sewage disposal plants. A specific object is to provide a defoamant for suppressing the formation of foam in aqueous media having a pH less than 7, that comprises an amine, a nonionic surface active agent, and a carrier therefor. Other objects and advantages of this invention will become apparent to those skilled in the art from the following detailed description.

In general, the present invention provides a composition for suppressing foam in aqueous media having a pH not greater than 7, which comprises critical amounts of an aliphatic amine having between 12 and 18 carbon atoms, and of a nonionic surface active agent, and a carrier therefor.

The amines utilizable in the compositions of this invention are the aliphatic amines, preferably those having between 8 and 18 carbon atoms. The amines can be primary, secondary, or tertiary amines having straight or branched chain, or alicyclic groups. Relatively pure compounds can be used, or the amines can be of commercial grade. Mixtures of two or more amines are also contemplated. Non-limiting examples of the amine component are tributylamine, 2-ethylhexylamine, decylamine, dicyclohexylamine, cyclohexylbutylamine, dodecylamine, hexadecylamine, hexadecenylamine, octadecylamine, octadecenylamine, octadecadienylamine, etc. Commercially available amines are particularly useful, such as, "Armeen TD" (30% hexadecylamine, 25% octadecylamine, and 45% octadecenylamine), "Armeen 2HT" (30% dihexadecylamine, 25% dioctadecylamine, and 45% dioctodecenylamine), tertiaryoctylamine

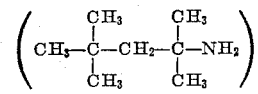

"Alkylamine 81" or "Primene 81" (mixture of primary amines having a tertiary carbon atom adjacent the nitrogen atom and containing 12–15 carbon atoms per alkyl chain), and "Alkylamine JM–R" or "Primene JM–R" (a mixture of primary amines having a tertiary carbon atom adjacent the nitrogen atoms and containing 18–24 carbon atoms per alkyl chain).

The surface active agents utilizable in the compositions of this invention are of the nonionic type, i.e., they are not dependent upon ionization for their surface active properties. Many such materials are well known to those skilled in the art. Preferred surface active agents are the polyoxyethylene ethers of octylphenol that have the following general structural formula:

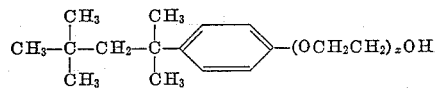

wherein $x$ is an integer varying between about 5 and about 13. Another type is the mono fatty acid ester of polyethylene glycol having the general formula:

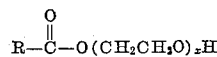

wherein R is an aliphatic radical having between about 11 and about 17 carbon atoms and $x$ is an integer varying between about 5 and about 50, preferably R will be 17 and $x$ will be 10. Still another class of surface active agent utilizable herein are the fatty acid esters of sorbitan, such as sorbitan monooleate.

The carrier utilizable in the composition of the present invention is a material in which the amine is soluble but which is substantially immiscible with water. A generally preferred carrier is a mineral oil of lubricating viscosity, preferably a mineral oil fraction having a Saybolt Universal viscosity of between about 30 and about 200 at 100° F. Other materials can be used that in themselves are not good defoamants, such as a mixture of alcohols, propylene glycol, alkylene glycol, ketones, esters, butyl-Cellosolve and butyl Carbitol, and the like.

Another component that can be used in the defoamant composition of this invention is a haze eliminator. In general, the materials utilizable as such are the fatty acids. Oleic acid is generally preferred although other acids, such as caprylic and linoleic acids are contemplated. It must be understood, however, that the primary function of the haze eliminator is to induce greater customer appeal. Accordingly, the haze eliminator can be omitted where this is not a consideration.

As has been mentioned hereinbefore, the amounts of aliphatic amine and of nonionic surface active agent used in the defoamant of this invention are critical in relation to each other. The amount of amine will vary between about 2 and about 50 weight percent. The amount of nonionic surface active agent must be between about 0.1 weight percent and about 0.5 weight percent. It has been found that if the nonionic surface active agent is used in greater concentrations than 0.5 weight percent, emulsion difficulties occur which interfere with the defoamant action. On the other hand, some surface active agent must be present in order to achieve good defoamant action. It is important, however, that the ratio of the amount of surface active agent to the amine must be between about 0.01 and about 0.05.

The haze eliminator, if used, can be present in an amount varying between about 1 weight percent and about 50 weight percent. The balance of the formulation will be the carrier, such as mineral oil.

The following specific examples are for the purpose of illustrating the defoamant compositions of this invention and of exemplifying the specific nature thereof. It is to be strictly understood, however, that this invention is not to be limited by the particular additives or to the operations and manipulations described therein. Other materials, as discussed hereinbefore, are utilizable, as those skilled in the art will readily appreciate.

For the determination of the effectiveness of defoamant formulations used in aqueous environments having a pH less than 7, such as those of sewage plants, the following testing method has been found to be correlative with commercial scale operations. Twenty milliliters of an aqueous solution containing about 0.05 weight percent of a foam-producing agent, such as Nacconol NR, are placed in a 100 milliliter graduated stoppered cylinder. One drop (approximately 0.05 milliliter) of the defoamant is added. The cylinder is then stoppered and shaken at the rate of one shake per second for a one minute period. Immediately after the shaking is stopped, the initial reading is taken. This reading is the total volume of liquid plus foam that is present in this cylinder. Subsequent readings are then taken at intervals of 10, 20, 30 and 60 seconds after the shaking operation has been stopped. Any defoamant that produces less than about 40 milliliters total volume of liquid and foam in this test is a satisfactory defoamant for use in acidic environments, such as those of sewage disposal plants.

EXAMPLE 1

A defoamant composition was prepared that contained 5.0 weight percent of a mixture of primary alkyl amines having a tertiary carbon atom adjacent the nitrogen atom and containing 12–15 carbon atoms per alkyl radical ("Primene 81"), 0.25 weight percent polyoxyethylene ether of octylphenol having the structure:

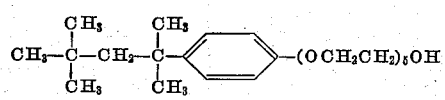

5 weight percent oleic acid, and 89.75 weight percent mineral oil having a Saybolt Universal viscosity of 100 seconds at 100° F. This composition was tested in the defoamant test. Pertinent data are set forth in Table I.

EXAMPLE 2

Another defoamant composition was prepared that was identical with the formulation described in Example 1 except that the concentration of the haze eliminator was 2.5 weight percent. Pertinent results of testing this composition in the foam test are given in Table I.

Table I

| Time (seconds) | Total volume foam plus liquid, ml. | |
|---|---|---|
| | Example 1 | Example 2 |
| 0 | 20 | 23 |
| 10 | | 22 |
| 20 | | 22 |
| 30 | | 22 |
| 60 | | 22 |

It will be apparent from the data of Table I that the defoamant composition of this invention is highly effective in preventing foaming in an acidic, aqueous medium. In order to further illustrate the effectiveness of the defoamant, the defoamant of Example 1 was subjected to the following test: 300 ml. of an aqueous solution containing 0.05% Nacconol NR were placed in a 1000 ml. graduated cylinder. Air was introduced into the bottom of the solution through a porous sphere, at the rate of 500 cc./min. The log of this test is given in Table II.

Table II

| Time | | | Ml. defoamant added | Total ml. defoamant of Ex. 1 added | Total volume foam and liquid ml. | Remarks |
|---|---|---|---|---|---|---|
| Hr. | Min. | Sec. | | | | |
| 0 | 0 | 0 | 0 | 0 | 300 | |
| 0 | 1 | 0 | 0.05 | 0.05 | 500 | |
| 0 | 1 | 45 | 0.05 | 0.10 | 700 | |
| 0 | 3 | 00 | 0.05 | 0.15 | 900 | |
| 0 | 5 | 00 | 0.05 | 0.20 | 1,000+ | Air off. |
| 0 | 7 | 00 | 0.05 | 0.25 | 1,000+ | |
| 0 | 9 | 00 | 0.05 | 0.30 | 750 | Air on. |
| 0 | 11 | 00 | 0.05 | 0.35 | 900 | |
| 0 | 13 | 00 | 0.05 | 0.40 | 1,000+ | Air off. |
| 0 | 15 | 00 | 0.05 | 0.45 | 750 | |
| 0 | 17 | 00 | 0.05 | 0.50 | 500 | |
| 0 | 19 | 00 | 0.05 | 0.55 | 325 | Air on. |
| 0 | 21 | 00 | 0.05 | 0.60 | 580 | |
| 0 | 23 | 00 | 0.05 | 0.65 | 670 | |
| 0 | 25 | 00 | 0.05 | 0.70 | 680 | |
| 0 | 27 | 00 | 0.05 | 0.75 | 520 | |
| 0 | 29 | 00 | 0.05 | 0.80 | 410 | |
| 0 | 31 | 00 | -------- | 0.80 | 300 | |
| 1 | 30 | 00 | -------- | 0.80 | 300 | |

These data show that the defoamant is as effective in a larger scale test as it is in the smaller scale test. Thus, the effectiveness of this formulation on the 20-ml. test is used as the standard of comparison for other amine formulations. The following examples demonstrate the effectiveness of defoamants having other amines therein.

EXAMPLES 3 THROUGH 8

Several defoamant formulations were prepared. Each formulation contained 0.25 weight percent of the polyoxyethylene ether of octylphenol described in Example 1, 5 weight percent oleic acid, and 89.75 weight percent of the 100-second mineral oil (Example 1). The formulations each had 5 weight percent of an amine. The amine used in each and the pertinent results of testing on the defoamant test (20 ml.) are set forth in Table III.

Table III

| Amine | Ex. 3 2-ethylhexyl | Ex. 4 di-Cyclohexyl | Ex. 5 Tributyl | Ex. 6 (1) | Ex. 7 (2) | Ex. 8 (3) |
|---|---|---|---|---|---|---|
| | Total volume foam+liquid, ml. | | | | | |
| Time (seconds): | | | | | | |
| 0 | 28 | 23 | 27 | 28 | 25 | 23 |
| 10 | 28 | 23 | 28 | 23 | 23 | 23 |
| 20 | 28 | 23 | 28 | 23 | 23 | 23 |
| 30 | 28 | 23 | 28 | 23 | 23 | 23 |
| 60 | 28 | 23 | 27 | 23 | 23 | 22 |

1 "Armeen TD."
2 "Armeen 2HT."
3 "Primene JM-R."

It will be apparent from the data in Table III that other amines, within the scope defined hereinbefore, are effective in the defoamant compositions of this invention. They are not all of equal effectiveness, but all are applicable herein.

It is preferred to use a defoamant having mineral oil as the carrier. Other carriers can be used, however, as will be apparent from the following examples.

EXAMPLES 9 THROUGH 16

A series of defoamant formulations was prepared, each containing 5 weight percent of the amine described in Example 1, and 0.25 weight percent of the polyoxyethylene ether of octylphenol defined in Example 1. In all cases, except Example 10, there was present 5 weight percent oleic acid. This was omitted in Example 10. The balance of each formulation was a carrier as described in Table IV. In each case there was 89.75 weight percent carrier, except for Example 10 which had as the carrier 1 weight percent glacial acetic acid and 93.75 weight percent water. Each formulation was subjected to the foam test, with the results given in Table IV.

Table IV

| Carrier | Example 9 | Example 10 | Example 11 | Example 12 | Example 13 | Example 14 | Example 15 | Example 16 |
|---|---|---|---|---|---|---|---|---|
| | HTP alcohol | Acetic acid water | Propylene glycol | Octylene glycol | Dioctyl-phthalate | Diisobutyl ketone | Butyl Cellosolve | Butyl Carbitol |
| Time (seconds): | Total volume foam plus liquid, ml. | | | | | | | |
| 0 | 28 | 28 | 27 | 27 | 22 | 25 | 29 | 30 |
| 10 | 25 | 29 | 27 | 27 | 21 | 23 | 30 | 30 |
| 20 | 24 | 28 | 27 | 27 | 21 | 22 | 30 | 30 |
| 30 | 24 | 28 | 27 | 26 | 20 | 22 | 30 | 29 |
| 60 | 23 | 27 | 25 | 25 | 20 | 21 | 28 | 26 |

It will be noted that dioctylphthalate and diisobutyl ketone are excellent carriers, as well as the mineral oil. The other carriers, however, although not equally effective, are entirely satisfactory in the defoamant compositions of this invention.

Surface active agents other than that described in Example 1 can be used, as was mentioned hereinbefore. This will be apparent from the following examples.

EXAMPLES 17 THROUGH 19

Three defoamant compositions were prepared.

Each contained 5 weight percent of the amine defined in Example 1, 5 weight percent oleic acid, and 89.75 weight percent mineral oil having a Saybolt Universal viscosity of 100 seconds at 100° F. The formulation of Example 17 had 0.25 weight percent of polyoxyethylene ether of octylphenol having the structural formula:

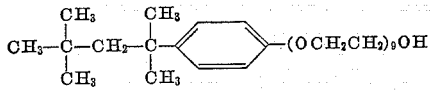

That of Example 18 contained 0.25 weight percent of a compound having the formula:

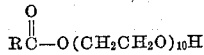

wherein R is the $C_{17}$ radical of oleic acid. The formulation of Example 19 contained 0.25 weight percent sorbitan monooleate. Each formulation was subjected to the 20-ml. defoamant test. Pertinent data are set forth in Table V.

Table V

| Time (seconds) | total volume foam plus liquid, ml. | | |
|---|---|---|---|
| | Example 17 | Example 18 | Example 19 |
| 0 | 26 | 26 | 25 |
| 10 | 25 | 25 | 24 |
| 20 | 24 | 25 | 24 |
| 30 | 24 | 25 | 24 |
| 60 | 24 | 24 | 23 |

In commercial practice, regardless of the actual concentration of the ingredients of the defoamant composition concentrate, the defoamant is introduced into the aqueous medium in controlled amounts. In general, the amount of amine that should be present in the aqueous medium, such as sewage, will be between about 0.025 and about 1 p.p.m. It will be recognized of course, that the corresponding amount of surface active agent present will be between 0.01 and 0.05 of the weight of amine. Accordingly, it is contemplated that concentrates of the defoamant composition can be used for greater facility of transportation. Such concentrates can be diluted with a carrier at the place of use.

This application is a continuation-in-part of copending application Serial Number 257,411, filed November 20, 1951, now abandoned.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A composition for suppressing foaming in aqueous media having a pH lower than 7, which comprises between about 2 and about 50 weight percent aliphatic amine containing between about 8 and about 18 carbon atoms; between about 0.1 and about 0.5 weight percent of a nonionic surface active agent, the weight ratio of said surface active agent to said amine being between about 0.01 and about 0.05; and the balance a mineral oil having a Saybolt Universal viscosity varying between about 30 and about 200 seconds at 100° F.

2. A composition for suppressing foaming in aqueous media having a pH lower than 7, which comprises between about 2 and about 50 weight percent of an aliphatic amine containing between about 8 and about 18 carbon atoms, between about 0.1 and about 0.5 weight percent of a nonionic surface active agent having the formula

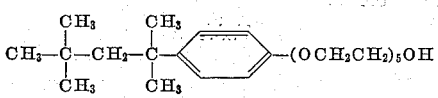

the weight ratio of said surface active agent to said amine being between about 0.01 and about 0.05; between about 1 and about 50 weight percent fatty acid, and the balance a mineral oil having a Saybolt Universal viscosity varying between about 30 and about 200 seconds at 100° F.

3. A composition as defined in claim 2 wherein the nonionic surface active agent is a compound having the formula

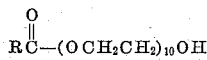

wherein R is the $C_{17}$ radical of oleic acid.

4. A composition as defined in claim 2 wherein the nonionic surface active agent is sorbitan mono oleate.

5. A composition for suppressing foaming in aqueous media having a pH lower than 7, which comprises about 5 weight percent of a mixture of primary amines having a tertiary carbon atom adjacent the nitrogen atom and containing between about 12 and about 15 carbon atoms per alkyl chain, about 0.25 weight percent of a nonionic surface active agent having the formula

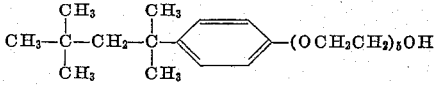

about 5 weight percent oleic acid, and the balance a mineral oil having a Saybolt Universal viscosity of about 100 seconds at 100° F.

6. A composition as defined in claim 5 wherein said surface active agent is a compound having the formula

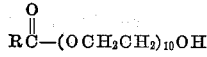

7. A composition as defined in claim 5 wherein the nonionic surface active agent is sorbitan mono oleate.

8. A composition for suppressing foaming in aqueous media having a pH lower than 7, which comprises about 5 weight percent dicyclohexylamine, about 0.25 weight percent of a nonionic surface active agent having the formula

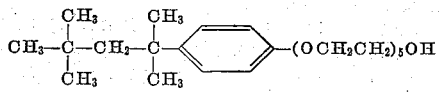

about 5 weight percent oleic acid, and the balance a mineral oil having a Saybolt Universal viscosity of about 100 seconds at 100° F.

9. A composition for suppressing foaming in aqueous media having a pH lower than 7, which comprises about 5 weight percent of a mixture of 30% hexyldecylamine, 25% octadecylamine and 45% octadecenylamine; about 0.25 weight percent of a nonionic surface active agent having the formula

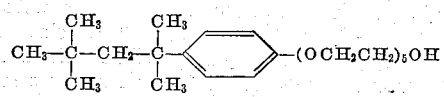

about 5 weight percent oleic acid, and the balance a mineral oil having a Saybolt Universal viscosity of about 100 seconds at 100° F.

References Cited in the file of this patent

UNITED STATES PATENTS

| | | |
|---|---|---|
| 2,400,543 | Denman | May 21, 1946 |
| 2,751,358 | Caviet | June 19, 1956 |
| 2,753,309 | Figdor | July 3, 1956 |

FOREIGN PATENTS

| | | |
|---|---|---|
| 717,078 | Germany | Feb. 5, 1942 |

OTHER REFERENCES

"The Chemistry of the Fatty Amines," Armour & Co. Chicago, 1948, p. 18.

"Tertiary Alkyl Primary Amines," pub. of Rohm & Haas Co., Phila., 1954, pp. 16 and 17.

"Ethofats, Ethomides Ethomeens," pub. of Armour, Chicago, 1954, p. 20.